United States Patent Office 3,567,776
Patented Mar. 2, 1971

---

3,567,776
N-ARYL AMIDES
John Krenzer, Oak Park, and Sidney B. Richter, Chicago, Ill., assignors to Velsicol Chemical Corporation, Chicago, Ill.
No Drawing. Filed Dec. 28, 1967, Ser. No. 694,042
Int. Cl. C07c 53/00, 63/04, 63/06
U.S. Cl. 260—545                7 Claims

ABSTRACT OF THE DISCLOSURE

A compound of the formula:

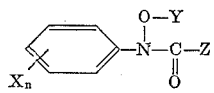

wherein $n$ is an integer of from 0 to 3; X is selected from the group consisting of halogen, an aliphatic radical, nitro, hydroxy, alkoxy and alkylsulfonyl and where Y is selected from the group consisting of alkyl and a carbamoyl radical of the formula:

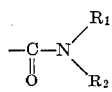

wherein $R_1$ and $R_2$ are independently selected from the group consisting of hydrogen, alkyl and phenyl; and Z is selected from the group consisting of an aliphatic radical, a cycloaliphatic radical, aryl, aralkyl and phenoxyalkyl. These compounds are useful as pesticides particularly as insecticides, nematocides, fungicides and herbicides.

---

This invention relates to new compounds and to pesticidal compositions containing such compounds as well as to methods of utilizing such compositions to control pests.

The compounds of this invention can be represented by the following formula:

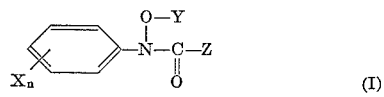

wherein $n$ is an integer of from 0 to 3; X is selected from the group consisting of halogen, an aliphatic radical, nitro, hydroxy, alkoxy and alkylsulfonyl and when $n$ is greater then one, X can be the same or different; Y is selected from the group consisting of alkyl and a carbamoyl radical of the formula:

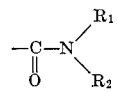

wherein $R_1$ and $R_2$ are independently selected from the group consisting of hydrogen, alkyl and phenyl; and Z is selected from the group consisting of an aliphatic radical, a cycloaliphatic radical, aryl, aralkyl and phenoxyalkyl. The compounds represented by the above general formula are effective as pesticides and particularly as herbicides, nematocides, fungicides or insecticides.

The compounds of this invention can in general be prepared by reaction a corresponding N-phenyl-N-hydroxy amide of the following formula:

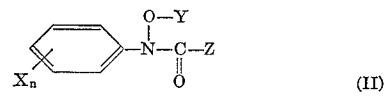

with an O-alkylating agent, an isocyanate or a carbamoyl halide to form the compounds of Formula I having the desired Y substituent on the oxygen atom. In the amide of Formula II, the X, $n$ and Z have the same significance as for Formula I above. For example, X can be halo such as chloro, bromo, iodo or fluoro; an aliphatic radical such as alkyl of from 1 to about 5 carbon atoms, or alkenyl of from 2 to about 5 carbon atoms; nitro; hydroxy; alkoxy where the alkyl portion contains from 1 to about 5 carbon atoms; or alkylsulfonyl where the alkyl group contains from 1 to about 5 carbon atoms; and Z can be an aliphatic radical such as alkyl of from 1 to about 5 carbon atoms or alkenyl of from 2 to about 5 carbon atoms; a cycloaliphatic radical such as cycloalkyl of from 3 to about 7 carbon atoms or cyclo alkenyl of from 5 to about 7 carbon atoms; aryl such as phenyl or naphthyl; aralkyl such as phenyl substituted alkyl where the alkyl group contains from 1 to about 5 carbon atoms or phenoxyalkyl where the alkyl group contains from 1 to about 5 carbon atoms. The Y substituent formed in the reaction, as indicated for Formula I, can be alkyl or a carbamoyl radical of the formula:

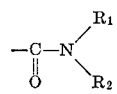

For example, Y can be alkyl of from 1 to about 5 carbon atoms or a carbamoyl radical where the $R_1$ and $R_2$ groups can be hydrogen, phenyl or an alkyl group containing from 1 to about 5 carbon atoms. The substituents X, Y, and Z where possible can also be substituted with such groups as halo, hydroxy, alkoxy or nitro or any combinations thereof. For example, X can be haloalkyl such as chloromethyl, chloroethyl, trifluoro methyl or haloalkenyl such as chlorovinyl; Z can be haloalkyl, haloalkenyl, halocycloalkyl such as chlorocyclohexyl; halophenyl such as 4-chlorophenyl, nitrophenyl such as 2-nitrophenyl, hydroxyphenyl such as methoxyphenyl, haloaralkyl such as 4-chlorobenzyl, nitroaralkyl such as 3-nitrobenzyl, or halophenoxyalkyl such as 3-bromophenoxymethyl; and Y can be haloalkyl or the $R_1$ or $R_2$ groups or both in the carbamoyl radical can be haloalkyl, halophenyl, nitrophenyl or alkoxyphenyl.

When preparing the compounds of this invention represented by Formula I where Y is alkyl, then the N-hydroxy-N-phenyl amide of Formula II is conveniently reacted with an O-alkylating agent. Suitable alkylating agents include alkyl halides or alkyl sulfates where the alkyl group contains from 1 to about 5 carbon atoms such as methyl, ethyl, propyl, butyl, pentyl or any isomers thereof. When preparing the compounds represented by Formula I where Y is a carbamoyl radical, then the amide of Formula II can be reacted with an isocyanate salt to form a carbamoyl radical where both $R_1$ and $R_2$ are hydrogen or the amide can be reacted with an isocyanate or with a carbamoyl halide to form a carbamoyl radical where $R_1$ or $R_2$ or both are phenyl or alkyl. Suitable isocyanates include potassium isocyanate, phenyl isocyanate or lower alkyl isocyanates and suitable carbamoyl halides include N,N-dimethylcarbamoyl chloride or N-methyl, N-phenylcarbamoyl chloride.

In reacting the N-phenyl-N-hydroxy amide of Formula II with the O-alkylating agent or with the isocyanate or carbamoyl chloride, the conditions and procedures utilized can be widely varied. Generally, however, those conditions and procedures which are commonly used for effecting similar reactions can be suitably employed. Typically, in effecting the O-alkylation reaction, the desired N-hydroxy-N-phenyl amide is charged together with a solvent such as dioxane, water and an acid acceptor such as sodium carbonate to a reaction vessel. Then the alkylating agent such as dimethyl sulfate can be added to the reaction mixture with the temperature maintained at about 30° to 60° C. After the reaction is completed, the desired product can then be recovered and purified utilizing conventional techniques including filtration and recrystallization. In effecting the reaction with an isocyanate, the procedure typically involved charging the desired N-hydroxy-N-phenyl amide together with the desired isocyanate such as methyl isocyanate, a solvent such as benzene and a catalyst such as trimethylamine to a reaction vessel. Then with stirring, the mixture is heated to a temperature of from about 30° to 80° C. for a period of time sufficient to complete the reaction. The desired product can then be recovered and purified utilizing conventional techniques. Examples of the compounds of this invention represented by the above Formula I which can thus be prepared include:

N-4-ethylphenyl-N-methoxy-acetamide,
N-4-bromophenyl-N-methoxy-propionamide,
N-3,4-dibromophenyl-N-methoxy-cyclopropyl-carboxamide,
N-3-propyl-4-nitrophenyl-N-ethoxy-isobutyramide,
N-2,4,6-trichlorophenyl-N-ethoxy-isobutyramide,
N-4-hydroxyphenyl-N-methoxy-acetamide,
N-2-bromo-4-chlorophenyl-N-methoxy-propionamide,
N-4-methylsulfonylphenyl-N-ethoxy-isobutyramide,
N-4-chlorophenyl-N-propoxy-acetamide,
N-3-chloro-4-methoxyphenyl-N-butoxy-acetamide,
N-2,6-diethylphenyl-N-methoxy-phenylacetamide,
N-3,4-dichlorophenyl-N-methoxy-benzamide,
N-3'-methyl-4'-chlorophenyl-N-methoxy-α-(3,4-dichlorophenyl)-acetamide,
N-4-bromophenyl-N-ethoxy-phenoxyacetamide,
N-4-chlorophenyl-N-methoxy-4-chlorocrotonamide,
N-3-nitro-4-methylphenyl-N-carbamoyloxy-acetamide,
N-4-chlorophenyl-N-(N'-methylcarbamoyloxy)-propionamide,
N-4-bromophenyl-N-(N',N'-dimethylcarbamoyloxy)-butyramide,
N-4-ethoxyphenyl-N-(N'-ethylcarbamoyloxy)-benzamide,
N-phenyl-N-(N'-methyl-N'-ethylcarbamoyloxy)-cyclopentylcarboxamide,
N-2-methoxy-6-ethylphenyl-N-(N'-phenylcarbamoyloxy)-bromoacetamide,
N-2,6-dichlorophenyl-N-(N'-p-chlorophenylcarbamoyloxy)-acetamide, or N-4-bromophenyl-N-(N,N'-diphenylcarbamoyloxy)-valeramide.

The N-hydroxy-N-phenyl amide, represented by Formula II above, which is utilized in the preparation of the compounds of this invention can be prepared by reacting an N-phenyl-hydroxylamine of the formula:

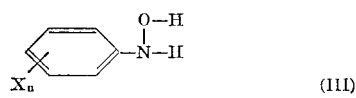

(III)

with an acid halide of the formula:

(IV)

where X, $n$ and Z have the same significance as for Formula I above and where Hal represents a halogen atom such as chlorine or bromine. Suitable N-phenyl-hydroxylamines of Formula II which can be utilized include: N-4-chlorophenyl-hydroxylamine, N-3,4-dichlorophenyl-hydroxylamine, N-4-bromophenyl-hydroxylamine, N-4-methylphenyl-hydroxylamine, N-(3-methyl-4-chlorophenyl)-hydroxylamine, N-4-ethylphenyl-hydroxylamine, N-4-chloroethylphenyl-hydroxylamine, N-4-nitrophenyl-hydroxylamine, N-4-hydroxyphenyl-hydroxylamine, or N-(3-methoxy-4-chlorophenyl)-hydroxylamine. Examples of suitable acid halides represented by Formula IV which can be reacted with the above N-phenyl-hydroxylamines include: bromoacetyl chloride, n-propionyl bromide, 4-chlorobutyryl chloride, crotonyl chloride, senecioyl chloride, acrylyl chloride, cyclopropylcarbonyl chloride, cyclohexylcarbonyl chloride, benzoyl chloride, 4-chlorobenzoyl chloride, phenylacetyl chloride, 4-chlorophenylacetyl chloride, phenoxyacetyl chloride, or 4-bromophenoxyacetyl chloride.

In reacting the acid halide IV with the N-phenyl-hydroxylamine III, the conditions and procedures can be varied. In general, however, the conditions and procedures commonly employed for similar reactions can be suitably employed. Typically, the desired N-phenyl-hydroxylamine is charged together with a suitable solvent such as dioxane, water and an acid acceptor such as sodium bicarbonate to a reaction vessel. Then with the temperature maintained about 0 to 5° C., the desired acid halide is added. When the reaction is complete, the desired product is recovered and purified by conventional techniques and then can be utilized as the starting material to prepare the compound of this invention.

The following examples are offered to further illustrate the compounds of this invention and the method of preparation therefor.

EXAMPLE 1

N-3,4-dichlorophenyl-N-(N-methylcarbamoyloxy)-n-butyramide

The corresponding N-hydroxy compound, N-3,4-dichlorophenyl-N-hydroxy-butyramide, was first prepared by charging 16 grams (0.09 mol) of N-3,4-dichlorophenyl-hydroxylamine, 10 grams of sodium bicarbonate, 100 ml. of dioxane and 30 ml. of water to a reaction flask. With stirring, 9.5 grams (0.09 mol) of n-butyryl chloride were slowly added over a period of about 15 minutes with the temperature maintained at about 0° to 5° C. After stirring for about ½ hour, the reaction mixture was combined with ice water. The resultant oil layer was extracted from the mixture with carbon tetrachloride. After drying the extract, the solvent was removed by distillation leaving a solid residue. The residue was washed with pentane and recrystallized from a benzenehexane mixture to yield 2.8 grams of a yellow, crystalline product having a melting point of 68° to 69° C.

Analysis for $C_{10}H_{11}Cl_2NO_2$: Theoretical percent: C, 48.44; H, 4.46; N, 5.64. Found (percent): C, 48.14; H, 4.56; N, 5.54.

Six grams (0.024 mol) of the above product were then charged together with 2.72 grams (0.048 mol) of methyl isocyanate, 30 ml. of benzene and 0.1 ml. of triethylamine, to a reaction flask. With stirring, the mixture was heated to reflux and maintain thereat for about 1 hour. The solid product which formed was recovered by filtration and recrystallized from a benzene-heptane layer in the presence of charcoal to yield 6.1 grams of a tan, crystalline product having a melting point of 88° to 90° C.

Analysis for $C_{12}H_{14}Cl_2N_2O_2$: Theoretical (percent): C, 47.23; H, 4.63; Cl, 23.22. Found (percent): C, 47.34; H, 4.79; Cl. 22.99.

EXAMPLE 2

N-4-methylphenyl-N-(N'-methylcarbamoyloxy)-isobutyramide

Using the same general procedure of Example 1, the corresponding N-hydroxy compound, N-4-methylphenyl-N-hydroxy-isobutyramide, was prepared by reacting N-4-methylphenyl-hydroxylamine with isobutyryl chloride. About 5 grams (0.026 mol) of this product were then reacted according to the general procedure of Example 1 with 3 grams (0.05 mol) of methyl isocyanate to produce 4.7 grams of a tan, crystalline product having a melting point of 120° to 121° C.

Analysis for $C_{13}H_{18}N_2O_3$: Theoretical (percent): C, 62.36; H, 7.26; N, 11.20. Found (percent): C, 62.72; H, 5.57; N, 10.86.

EXAMPLE 3

N-3-chloro-4-methylphenyl-N-(N-methylcarbamoyloxy)-n-butyramide

Using the same general procedure of Example 1, the corresponding N-hydroxy compound, N-3-chloro-4-methyl methylphenyl -N-hydroxy-n-butyramide, was prepared by reacting N-3-chloro-4-methylphenyl-hydroxylamine with n-butyryl chloride. About 4.0 grams (0.018 mol) of this product were then reacted, according to the general procedure of Example 1, with 4.1 grams (0.07 mol) of methyl isocyanate to produce 4.2 grams of a tan, crystalline product having a melting point of 86° to 88° C.

Analysis for $C_{13}H_{17}ClN_2O_3$: Theoretical (percent): C, 54.83; H, 6.02; N, 9.84. Found (percent): C, 54.98; H, 6.24; N, 9.62.

EXAMPLE 4

N-4'-chlorophenyl-N-(N-methylcarbamoyloxy)-α-(4-chloro-2-methylphenoxy)-acetamide Using the same general procedure of Example 1, the corresponding N-hydroxy compound, N-4'-chlorophenyl-N-hydroxy-α-(4-chloro-2-methylphenoxy)-acetamide, was prepared by reacting N-4-chlorophenyl-hydroxylamine with α-(4-chloro-2-methylphenoxy)-acetyl chloride. About 3.2 grams (0.01 mol) of this product were then reacted with 1.0 grams (0.017 mol) of methyl isocyanate, according to the general procedure of Example 1, to produce 3.1 grams of a white, crystalline product having a melting point of 123° to 125° C.

Analysis for $C_{17}H_{16}Cl_2N_2O_4$: Theoretical (percent): C, 53.28; H, 4.21; Cl, 18.51. Found (percent): C, 53.58; H, 4.70; Cl, 18.43.

EXAMPLE 5

N-4-chlorophenyl-N-(N-methylcarbamoyloxy)-chloroacetamide

Using the same general procedure of Example 1, the corresponding N-hydroxy compound, N-4-chlorophenyl-N-hydroxy-chloroacetamide, was prepared by reacting N-4-chlorophenyl-hydroxylamine with chloroacetyl chloride. About 8.5 grams (0.038 mol) of this product were then reacted with 2.3 grams (0.04 mol) of methyl isocyanate, according to the general procedure of Example 1, to produce 9.2 grams of a tan, crystalline product having a melting point of 133° to 135° C.

Analysis for $C_{10}H_{10}Cl_2N_2O_3$: Theoretical (percent): C, 43.37; H, 3.64; Cl, 25.59. Found (percent): C, 43.84; H, 3.87; Cl, 25.62.

EXAMPLE 6

N-phenyl-N-methoxy-chloroacetamide

Using the general procedure of Example 1, the corresponding N-hydroxy compound, N-phenyl-N-hydroxy-chloroacetamide, was prepared by reaction N-phenyl-hydroxylamine with chloroacetyl chloride. About 20.0 grams (0.11 mol) of this product were charged together with 100 ml. of dioxane, 100 ml. of water and 11.5 grams of sodium carbonate to a reaction flask. With the temperature at about 35° C., 20.4 grams (0.16 mol) of dimethyl sulfate were added over a period of about 10 minutes. The mixture was stirred for about 2 hours, cooled to 20° C. and then was combined with ice water and cooled to about 5° C. The resulting solids were recovered and dissolved in diethyl ether. The solution was dried over magnesium sulfate and then pentane was added followed by cooling. The precipitated solids were recovered to yield 13.3 grams of a crystalline product having a melting point of 55° to 57° C.

Analysis for $C_9H_{10}ClNO_2$: Theoretical (percent): C, 54.14; H, 5.06; N, 7.02; Cl, 17.75. Found (percent): C, 53.80; H, 5.24; N, 7.09; Cl, 17.68.

EXAMPLE 7

N-3,4-dichlorophenyl-N-methoxy-chloroacetamide

Using the general procedure of Example 1, the corresponding N-hydroxy compound, N-3,4-dichloro-phenyl-N-hydroxy-chloroacetamide, was prepared by reacting N-3,4-dichlorophenyl-hydroxylamine with chloroacetyl chloride. About 2.7 grams (0.011 mol) of this product were then reacted with 1.88 grams (0.015 mol) of dimethyl sulfate, according to the general procedure of Example 6, to produce 0.95 gram of a product having a melting point of 83° to 86° C.

Analysis for $C_9H_8Cl_3NO_2$: Theoretical (percent): C, 40.25; H, 3.00; N, 5.22; Cl 39.62. Found (percent): C, 40.02; H, 3.21; N, 5.12; Cl, 39.46.

EXAMPLE 8

N-phenyl-N-methoxy-propionamide

Using the general procedure of Example 1, the corresponding N-hydroxy compound, N-phenyl-N-hydroxy-propionamide, was prepared by reaction N-phenyl-hydroxylamine with propionyl chloride. About 6.0 grams (0.033 mol) of this product were then reacted with 5.0 grams (0.04 mol) of dimethyl sulfate, according to the general procedure of Example 6, to produce a product boiling at 85° to 90° C. at 2 mm. Hg and having a refractive index of $n_D^{20}$ of 1.5540.

Analysis for $C_{10}H_{13}NO_2$: Theoretical (percent): C, 67.00; H, 7.31; N, 7.82. Found (percent): C, 66.42; H, 7.24; N, 7.84.

EXAMPLE 9

N-4-chlorophenyl-N-methoxy-chloroacetamide

Using the general procedure of Example 1 the corresponding N-hydroxy compound, N-4-chlorophenyl-N-hydroxy-chloroacetamide, was prepared by reacting N-4-chlorophenyl-hydroxylamine with chloroacetyl chloride. About 5.0 grams (0.023 mol) of this product were reacted with 4.3 grams (0.034 mol) of dimethyl sulfate, according to the general procedure of Example 6, to produce 2.0 grams of the product having a melting point of 70° to 72° C.

Analysis for $C_9H_9Cl_2NO_2$: Theoretical (percent): C, 46.19; H, 3.88; N, 5.98; Cl, 30.28. Found (percent): C, 46.67; H, 4.02; N, 5.65; Cl, 30.20

EXAMPLE 10

N-3-chlorophenyl-N-methoxy-chloroacetamide

Using the general procedure of Example 1, the corresponding N-hydroxy compound, N-3-chlorophenyl-N-hydroxy-chloroacetamide was prepared by reacting N-3-chlorophenyl-hydroxylamine with chloroacetyl chloride. About 6.0 grams (0.027 mol) of this product were then reacted with 4.8 grams (0.038 mol) of dimethyl sulfate, according to the general procedure of Example 6, to produce 3.9 grams of a pale yellow product having a melting point of 62° to 64° C.

Analysis for $C_9H_9Cl_2NO_2$: Theoretical (percent): C, 46.20; H, 3.88; N, 5.98; Cl, 30.27. Found (percent): C, 46.62; H, 3.97; N, 5.93; Cl, 29.36.

EXAMPLE 11

N-3-methylphenyl-N-methoxy-chloroacetamide

Using the general procedure of Example 1, the corresponding N-hydroxy compound, N-3-methylphenyl-N-hydroxy-chloroacetamide, was prepared by reacting N-3-methylphenyl-hydroxylamine with chloroacetyl chloride. About 5.6 grams (0.02 mol) of this product were then reacted with 4.8 grams (0.038 mol) of dimethyl sulfate, according to the general procedure of Example 6, to produce 1.6 grams of a tan product having a melting point of 68° to 70° C.

Analysis for $C_{10}H_{12}ClNO_2$: Theoretical (percent): C, 56.20; H, 5.67; Cl, 16.60. Found (percent): C, 56.29; H, 5.71; Cl, 16.48.

EXAMPLE 12

N-3,4-dichlorophenyl-N-methoxy-isobutyramide

Using the general procedure of Example 1, the corresponding N-hydroxy compound, N-3,4-dichlorophenyl-N-hydroxy-isobutyramide, was first prepared by reacting N-3,4-dichlorophenyl-hydroxylamine with isobutyryl chloride. About 2.0 grams (0.008 mol) of this product were then reacted with 1.2 grams (0.0096 mol) of dimethyl sulfate according to the general procedure of Example 6 to produce the desired product having a boiling point of 112° to 115° C. at 0.25 mm. Hg and a refractive index $n_D^{27}$ 1.5434.

Analysis for $C_{11}H_{13}Cl_2NO_2$: Theoretical (percent): C, 50.38; H, 5.00; Cl, 27.08. Found (percent): C, 49.86; H, 5.09; Cl, 26.45.

EXAMPLE 13

N-3,4-dichlorophenyl-N-methoxy-crotonamide

Using the general procedure of Example 1, the corresponding N-hydroxy compound, N-3,4-dichlorophenyl-N-hydroxy-crotonamide, was first prepared by reacting N-3,4-dichlorophenyl-hydroxylamine with crotonyl chloride. About 3.0 grams (0.017 mol) of this product were then reacted with 1.8 grams (0.014 mol) of dimethyl sulfate according to the general procedure of Example 6 to produce 2.7 grams of the product having a melting point of 98° to 100° C.

Analysis for $C_{11}H_{11}Cl_2NO_2$: Theoretical (percent): C, 50.81; H, 4.26; Cl, 27.24. Found (percent): C, 50.83; H, 4.38; Cl, 27.17.

EXAMPLE 14

N-3-chloro-4-methylphenyl-N-methoxyisobutyramide

Using the general procedure of Example 1, the corresponding N-hydroxy compound, N-3-chloro-4-methylphenyl-N-hydroxy-isobutyramide, was first prepared by reacting N-3-chloro-4-methyl-hydroxylamine with isobutyryl chloride. About 6.1 grams (0.027 mol) of this product were then reacted with 3.3 ml. (0.035 mol) of dimethyl sulfate according to the general procedure of Example 6 to produce 1.8 grams of a product having a boiling point of 101° C. at 0.06 mm. Hg and a refractive index $n_D^{25}$ 1.5283.

Analysis for $C_{12}H_{16}ClNO_2$: Theoretical (percent): C, 59.74; H, 6.68; Cl, 14.69. Found (percent): C, 59.43; H, 6.75; Cl 14.88.

EXAMPLE 15

N-4-chlorophenyl-N-methoxyisobutyramide

Using the general procedure of Example 1, the corresponding N-hydroxy compound, N-4-chlorophenyl-N-hydroxy isobutyramide, was first prepared by reacting N-4-chlorophenyl-hydroxylamine with isobutyryl chloride. About 10 grams (0.047 mol) of this product were then reacted with 7.6 grams (0.06 mol) of dimethyl sulfate according to the general procedure of Example 6 to produce 2.5 grams of the product having a boiling point of 100° to 101° C. at 0.06 mm. Hg and a refractive index $n_D^{25}$ 1.5265.

Analysis for $C_{11}H_{14}ClNO_2$: Theoretical (percent): C, 57.96; H, 6.21; Cl, 15.59. Found (percent): C, 57.26; H, 6.44; Cl, 15.73.

EXAMPLE 16

N-3,4-dimethylphenyl-N-methoxychloroacetamide

Using the general procedure of Example 1, the corresponding N-hydroxy compound, N-3,4-dimethylphenyl-N-hydroxy-chloroacetamide, was first prepared by reacting N-3,4-dimethylphenyl-hydroxylamine with chloroacetyl chloride. About 5.0 grams (0.023 mol) of this product were then reacted with 3.8 grams (0.03 mol) of dimethyl sulfate according to the general procedure of Example 6 to produce 2.3 grams of a yellow crystalline product having a melting point of 58° to 60° C.

Analysis for $C_{11}H_{14}ClNO_2$: Theoretical (percent): C, 57.96; H, 6.21; Cl, 15.59. Found (percent): C, 58.11; H, 6.34; Cl, 15.20.

EXAMPLE 17

N-2-methyl-3-chlorophenyl-N-methoxychloroacetamide

Using the general procedure of Example 1, the corresponding N-hydroxy compound, N-2-methyl-3-chlorophenyl-N-hydroxy-chloroacetamide, was first prepared by reaction N-2-methyl-3-chlorophenyl-hydroxylamine with chloroacetyl chloride. About 10 grams (0.043 mol) of this product were then reacted with 7.1 grams (0.056 mol) of dimethyl sulfate according to the general procedure of Example 6 to produce 2.4 grams of a pale yellow product having a melting point of 73 to 74° C.

Analysis for $C_{10}H_{11}Cl_2NO_2$: Theoretical (percent): C, 48.44; H, 4.46; Cl, 28.56. Found (percent): C, 48.45; H, 4.62; Cl, 28.62.

EXAMPLE 18

N-2-chlorophenyl-N-methoxychloroacetamide

Using the general procedure of Example 1, the corresponding N-hydroxy compound, N-2-chlorophenyl-N-hydroxy-chloroacetamide, was first prepared by reacting N-2-chlorophenyl-hydroxylamine with chloroacetyl chloride. About 5 grams (0.023 mol) of this product were then reacted with 3.5 grams (0.028 mol) of dimethyl sulfate according to the general procedure of Example 6 to produce 2.3 grams of a pale yellow, crystalline product having a melting point of 54° to 55° C.

Analysis for $C_9H_9Cl_2NO_2$: Theoretical (percent): C, 46.19; H, 3.88; Cl, 30.28. Found (percent): C, 46.22; H, 4.03; Cl, 29.28.

EXAMPLE 19

N-4'-chlorophenyl-N-methoxy-2-methoxy-3,6-dichlorobenzamide

Using the general procedure of Example 1, the corresponding N-hydroxy compound, N-4'-chlorophenyl-N-hydroxy-2-methoxy-3,6-dichlorobenzamide, was first prepared by reacting N-4-chlorophenyl-hydroxylamine with 2-methoxy-3,6-dichlorobenzyl chloride. About 5.4 grams (0.016 mol) of this product were then reacted with 2.7 grams (0.021 mol) of dimethyl sulfate according to the general procedure of Example 6 to produce 4.2 grams of a white, crystalline product having a melting point of 94° to 97° C.

Analysis for $C_{15}H_{12}Cl_3NO_3$: Theoretical (percent): C, 47.96; H, 3.36; Cl, 29.52. Found (percent): C, 49.74; H, 3.47; Cl, 29.83.

EXAMPLE 20

N-4'-chlorophenyl-N-methoxy-α-(2-methyl-4-chlorophenoxy)-acetamide

Using the general procedure of Example 1, the corresponding N-hydroxy compound, N-4'-chlorophenyl-N-methoxy-α-(2-methyl-4-chlorophenoxy)-acetamide was prepared by reacting N-4-chlorophenyl-hydroxylamine with 2-methyl-4-chlorophenoxy-acetyl chloride. About 6.0 grams (0.014 mol) of this product were then reacted with 3 grams (0.024 mol) of dimethyl sulfate according to the general procedure of Example 6 to produce 3.9 grams of a pale yellow, crystalline product having a melting point of 86° to 87° C.

Analysis for $C_{16}H_{15}Cl_2NO_3$: Theoretical (percent): C, 56.48; H, 4.45; Cl, 20.84. Found (percent): C, 56.19; H, 4.57; Cl, 21.22.

EXAMPLE 21

N-3-nitro-4-methylphenyl-N-methoxy-propionamide

Using the general procedure of Example 1, the corresponding N-hydroxy compound, N-3-nitro-4-methylphenyl-N-hydroxy-propionamide, was first prepared by reacting N-3-nitro-4-methylphenyl-hydroxylamine with propionyl chloride. About 4.0 grams (0.018 mol) of this product were then reacted with 3.1 grams (0.025 mol) of dimethyl sulfate according to the general procedure of Example 6 to produce 2.5 grams of a pale yellow product having a melting point of 58° to 60° C.

Analysis for $C_{11}H_{14}N_2O_4$: Theoretical (percent): C, 55.45; H, 5.92; N, 11.76. Found (percent): C, 55.17; H, 6.30; N, 11.30.

EXAMPLE 22

N-4-methylsulfonylphenyl-N-methoxy-chloroacetamide

Using the general procedure of Example 1, the corresponding N-hydroxy compound, N-4-methylsulfonylphenyl-N-hydroxy-chloroacetamide is prepared by reacting N-4-methylsulfonylphenyl-hydroxylamine with chloroacetyl chloride. About 6.5 grams (0.025 mol) of this product are then charged together with 100 ml. of dioxane, 100 ml. of water and 11.5 grams of sodium carbonate to a reaction flask. With the temperature at about 35° C., 3.1 grams (0.025 mol) of dimethyl sulfate are added over a period of about 10 minutes. The mixture is stirred for about 2 hours, cooled to 20° C., and then is combined with ice water and cooled to about 5° C. The resulting solids are recovered and dissolved in diethyl ether. The solution is dried over magnesium sulfate and then pentane is added followed by cooling. The precipitated solids are recovered to yield the desired product.

As indicated, the compounds of this invention are useful as pesticides and particularly as herbicides, fungicides, insecticides or nematocides. As used herein the term pesticide includes herbicide, fungicide, nematocide or insecticide.

For practical use as pesticides, the compounds of this invention are generally incorporated into pesticidal compositions which comprise an inert carrier and a pesticidally toxic amount of the compounds. Such pesticidal composition, also defined as formulations, enable the active compound to be applied conveniently, in any desired quantity, to the site of the pest infestation, such as fungus, insect, nematode or mite infestation or to the site of undesired vegetation. These compositions can be solids such as dusts, granules, or wettable powders, or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the compounds are sufficiently soluble in common organic solvents such as kerosene or xylene so that they can be used directly dissolved in such solvents. Frequently, these solutions can be dispersed under superatmospheric pressure as aerosols. However, preferred liquid pesticidal compositions are emulsifiable concentrates, which comprise one or more compounds according to this invention and as the inert carrier, a solvent and an emulsifier. Such emulsifiable concentrates can be extended with water and/or oil to any desired concentration of the compound for application as sprays to the site of the pest infestation or to the site of the undesired vegetation. The emulsifiers most commonly used in these concentrates are nonionic or mixtures of nonionic with anionic surface-active agents.

A typical pesticidal composition according to this invention is illustrated by the following example, in which the quantities are in parts by weight.

EXAMPLE 23

Preparation of a dust

Product of Example 1 _____ 10
Powdered talc _____ 90

The above ingredients are mixed in a mechanical grinder-blender and are ground until a homogeneous, free-flowing dust of the desired particle size is obtained. This dust is suitable for direct application to the site of the pest infestation or to the site of unwanted vegetation.

The compounds of this invention can be applied as pesticides in any manner recognized by the art. One method for destroying pests or undesired vegetation comprises applying to the locus of the pest infestation or the undesired vegetation a pesticidal composition comprising an inert carrier and as the essential active ingredient, in a quantity which is toxic to said pests or to such vegetation at least one of the compounds of this invention. The concentration of the compounds of this invention individually or in admixture in the pesticidal compositions will vary greatly depending on the type of formulation and the purpose for which it is designed, but generally the compositions will contain from about 0.05 to about 95 percent by weight of the compounds of this invention. In a preferred embodiment of this invention, the pesticidal compositions will contain from about 5 to 75 percent by weight of the compound. The compositions can also contain additional substances such as other pesticides, stabilizers, spreaders, deactivators, adhesives, stickers, fertilizers, or activators.

When the compounds of this invention are used as insecticides they can be employed in several different ways. When used as stomach poisons or protective materials they can be applied to the surface on which the insects feed or travel. The compounds which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systemically.

The above methods of using insecticides are based on the fact that almost all the injury done by insects is a direct or indirect result of their attempts to secure food. Indeed, the large number of destructive insects can be a classified broadly on the basis of their feeding habits. Among the insects which can be effectively controlled by the compounds of the present invention are the chewing insects such as the Mexican bean beetle, the southern armyworm; the piercing-sucking insects, such as the pea aphid, the cereal leaf beetle, the house fly, the grape leafhopper, the chinch bug, the lygus bugs, oyster shell scale, the California red scale, the Florida red scale, the soft scale and mosquitoes; the internal feeders, including borers such as the European corn borer, the peach twig borer and the corn earworm, worms or weevils such as the codling moth, alfalfa weevil, cotton boll weevil, pink boll worm, plum curculio, red banded leaf roller, melonworm, cabbage looper and apple maggot, leaf miners such as the apple leaf miner, birch leaf miner and beet leaf miner, and gall insects such as the wheat joint worm and the grape phylloxera. Insects which attack below the surface of the ground are classified as subterranean insects and include such destructive pests as the wooly aphid, the Japanese beetle, the onion maggot and the corn rootworm.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of light infestation of an insect under conditions unfavorable for its feeding, while a pound or more of active compound per acre may be required for the control of a heavy infestation of insects under conditions favorable to their development.

When the compounds of this invention are used as agricultural fungicides, they can be applied to plant foliage, to seeds, to the soil, or to such parts of plants as the fruits themselves. Plants are susceptible to a great many diseases which cause widespread damage; and among some of the more important which can be mentioned are late blight on tomato, powdery mildew on cucumber (*Erisiphe cichoracearum*), cereal leaf rust on wheat (*Puccinia rubigovera*), and such common soil fungi as fusarium wilt (*Fusarium oxysporum*), the seed rot fungus (*Phythium debaryanum*), and the sheath and culm blight (*Rhizoctonia solani*). The new compounds of this invention can also be employed as industrial fungicides to control a variety of fungi which attack such materials as adhesives, cork, paints, lacquers, leather, wood, plastics, and textiles such as cotton and wool.

The quantity of active compound of this invention to be used for good disease control will depend on a variety of factors, such as the particular disease involved, the intensity of the infestation, formulation, weather, type of crop and the like. Thus, while the application of only one or two ounces of active compound per acre of a crop may be sufficient to control a light infestation of certain fungi, a pound or more of active compound per acre may be required to control a heavy infestation of a hardy species of fungus.

When the compounds of this invention are used as nematocides to control or prevent infestations of destructive nematodes, they are ordinarily used as soil treatments. Plant parasitic nematodes occur in enormous numbers in all kinds of soil in which plants can grow, and many plant pathologists believe that all the crop and ornamental plants grown in the world can be attacked by these nematodes. The destructive species of nematodes range from the highly specialized, which attack only a few kinds of plants, to the polyphagous, which attack a great many different plants. The plants almost invariably become infected by nematodes that move into them from the soil. The underground parts of plants, roots, tubers, corns, and rhizomes are thus more apt to be infected than aboveground parts, but infection of stems, leaves, and flower parts is also fairly common.

Damage to plants attacked by nematodes is due primarily to the feeding of the nematodes on the plant tissues. The nematodes may enter the plant to feed, may feed from the outside, or be only partially embedded. The feeding of a nematode may kill the cell or may simply interfere with its normal functioning. If the cell is killed, it is often quickly invaded by bacteria or fungi. If the cell is not killed, it and the adjacent cells may be stimulated to enlarge or multiply. Hence the most common types of nematode damage are manifested as rotting of the attacked parts and adjacent tissue or the development of galls and other abnormal growths. Either can interfere with the orderly development of the plant and cause shortening of stems or roots, twisting, crinkling or death of parts of stems and leaves, and other abnormalities. Consequently, the yield of crop plants is reduced, while a high-quality crop cannot be produced from the crippled plants.

The use of the compounds of this invention for nematode control can make the difference between a good crop and one not worth harvesting. Once the nematodes are controlled, yield increases of 25 to 50 percent are not uncommon. The solid or liquid nematocidal compositions of this invention can be applied to the soil, or in some cases to the plants and soil, in any convenient manner. While broadcase applications to the soil before planting by conventional plow or disc methods are effective, specialized methods such as row placement application, split-dosage applications, post-planting sidepress applications, and the like are also useful. The active compounds of this invention are applied in amounts sufficient to exert the desired nematocidal action. The amount of the active compound present in the nematocidal compositions as actually applied for preventing or controlling nematode infestations varies with the type of application, the particular species which are to be controlled, and the purpose for which the treatment is made.

When the compound of this invention are used as herbicides, they may be used to destroy undesired vegetation usually referred to as weeds. Weeds, frequently classified as broadleaf or grassy weeds, are undesirable plants which grow where they are not wanted, have no economic value, and interfer with the production of cultivated crops, and the growing of ornamental plants, or with the welfare of livestock. Many types of weeds are known, including annuals such as pigweed, lambsquarters, foxtail, crabgrass, wild mustard, field pennycress, ryegrass, goose-grass, chickweed, wild oats, velvet leaf, purselane, barnyard grass, smartweed, knotweed, cocklebur, wild buckwheat, kochia, medic, corn cockle, ragweed, sowthistle coffeeweed, croton, cuphea, dodder, fumitory, groundsel, hemp nettle, knowel, spurge, spurry, emex, jungle rice, pondweed, dog fennel, carpetweed, morning glory, bedstraw, ducksalad and naiad; biennials such as wild carrot, matricaria, wild barley, campion, chamomile, burdock, mullein, round-leaved mallow, bull thistle; or perennials such as white cockle, perennial ryegrass, quackgrass, Johnson grass, Canada thistle, hedge bindweed, Bermuda grass, sheep sorrelfi curly dock, nutgrass, field chickweed, dandelion, campanula, field bindweed, Russian knapweed, mesquite, toadflax, yarrow, aster, gromwell, horsetail, ironweed, sesbania, bulrush, cattail and winter-cress.

The new compounds of this invention are particularly valuable for weed control because they are toxic to many species and groups of weeds while they are relatively nontoxic to many beneficial plants. The exact amount of compound required for herbicides will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more of active compound per acre may be required for good control of a dense infestation of hardy perennial weeds growing under favorable conditions.

The compounds of this invention can be combined with different fungicides, nematocides, insecticides or herbicides or combinations thereof to form either synergistic pesticide compositions or pesticide compositions capable of more than pesticidal activity such as a pesticidal composition having both fungicidal and nematocidal activity. For example, the compounds may be combined with insecticides such as halogenated compounds for example, DDT, methoxychlor, TDE, lindane, chlordane, isobenzan, aldrin, dieldrin, heptachlor, endrin, mirex, endosulfon, dicofol, and the like; organic phosphorus compounds, for example, TEPP, schradan, ethion, parathion, methyl parathion, EPN, demeton, carbonphenothion, phorate, zinophos, diazinon, malathion, mevinphos, dimethoate, DBD, ronnel, oxydemeton-methyl, dicapthon, chlorothion phosphamidon, naled, fenthion, trichlorofon, or DDVP; organic nitrogen compounds, for example, dinitro-o-cresol, dinitrocyclorexylphenol, DNB, DNP, binapacril, azobenzene, and the like; organic carbamate compounds, for example, carbaryl or ortho 5353, organic sulfur compounds for example phenothiazine, phenoxathin, lauryl thiocyanate, [bis(2 - thiocyanoethyl)ether] or isobornyl thiocyanoacetate; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide or paradichlorobenzene; with fungicides such as ferbam, nabam, zineb, ziram, thiram, chloranil, dichlone, glyodin, cycloheximide, dinocap, maneb, captan, dodine, PCNB, or p-dimethylaminobenzenediazo sodium sulfonate; with nematocides such as chloropicrin, O,O-diethyl-O-(2,4 - dichlorophenyl) - phosphorothioate, tetrachlorothiophene, dazomet, or dibromochloropropane; with herbicides, defoliants, dessicants or growth inhibitors such as chlorophenoxy herbicides for example, 2,4-D, 2,4,5-T, MCPA,, MCPB, 4(2,4-DB), 2,4-DEB, 4-CPB, 4-CPA, 4-Cpp, 2,4,5-TB, 2,4,5-TES, 3,4-DA, silvex and the like; carbamate herbicides for example IPC, CIPC, swep, barban, BCPC, CEPC, or CPPC, thiocarbamate and dithiocarbamate herbicides for example CDEC, metham sodium, EPTC, diallate, PEBC, perbulate, or vernolate; substiuted urea herbicides for example norea, siduran, dichloral urea, chloroxuron, cycluron, fenuron, monuron, monuron TCA, diuron, linuron, monlinuron, neburon, buturon, or trimeturon; symmertical triazine herbicides for example simazine, chlorazine, atratone, desmetryne, norazine, ipazine, prometryn, atrazine, trietazine, simetone, prometone, propazine, or ametryne; chloroacetamide herbicides for example alpha-chloro-N,N-dimethylacetamide, CDEA, CDAA, alpha-chloro-N-isopropylacetamide, 2 - chloro-N-isopropylacetanilide, 4 - (chloroacetyl) morpholine, or 1-(chloroacetyl) piperidine; chlorinated aliphatic acid herbicides for example TCA, dalapon, 2,3-dichloropropionic acid, or 2,2,3-TPA, chlorinated benzoic acid and phenylacetic acid herbicides for example 2,3,6-TBA, 2,3,5,6-TBA, dicamba, tricamba, amiben, fenac, PBA 2-methoxy-3,6-dichlorophenylacetic acid, 3-methoxy-2,6-dichlorophenylacetic acid, 2-methoxy-3,5,6-trichlorophenylacetic acid, or 2,5-dichloro-3-aminobenzoic acid; and such compounds as aminotriazole, maleic hydrazide, phenyl mercuric acetate, endothal, biuret, technical chlordane, dimethyl 2,3,5,6-tetrachloroterephthalate, diquat, erbon, DNC, DNBP, dichlobenil; DPA, diphenamid, dipropalin, trifluarlin, solan, dicryl, merphos, DMPA, o-S-dimethyl tetrachlorothioterephthalate, methyl 2,3,5,6-tetrachloro-N-methoxy-N-methyl-terephthalate, 2[(4 - chloro - o - tolyl)oxy]-N-methoxy-acetamide, DSMA, MSMA, potassium azide, acrolein, benefin, bensulide, AMS, bromacil, bromoxynil, cacodylic acid, CMA, CPMF, cypromid, DCB, DCPA, dichlone, diphenatril, DMTT, DNAP, EBEP, EXD, HCA, ioxynil, IPX, isocil, potassium cyanate, MAA, MAMA, MCPES, MCPP, MH, molinate, NPA, OCH, paraquat, PCP, picloram, DPA, PCA, pyrichlor, sesone, terbacil, terbutol, TCBA, brominil, CP-50144, H-176-1, H-632, M-2901, planavin, sodium tetravorate, calcium cyanamid, DEF, ethyl xanthogen disulfide, sindone, sindone B, or propanil.

The pesticidal activity of the compounds of this invention may be illustrated by the following examples:

EXAMPLE 24

The fungicidal activity of the compounds of this invention can be demonstrated by the following tests.

An emulsifiable concentrate containing the test compound at a rate of 25 mg. per ml. was prepared by dissolving the compound in a suitable solvent such as acetone containing a surface active agent (polyoxyalkylene derivatives of sorbitan monolaurate and/or monooleate; 2.48 mg. per 80 ml. of acetone).

The compounds were used to control the fungi Rhizoctonia solani and Fusarium oxysporum by first preparing an aqueous fungicidal composition by admixing 1 ml. of the above emulsifiable concentrate with 77 ml. of water. Two series of soil samples were prepared by placing about 100 ml. of soil into paper cups. In each series the soil had been inoculated with one of the respective fungi which had been obtained from cultures ranging in age of about 10 to 14 days. A portion of the soil samples in each series were treated by drenching the soil in the cups with the fungicidal composition in an amount sufficient to provide an application rate equivalent to 100 pounds of the compound per one acre having a depth of 4 inches. The other portion of the soil samples from each series were not so treated and were used as comparative samples. All of the cups were then sealed and stored under conditions favorable to fungus growth for a period ranging from about 2 to 4 days. At the end of the period, the cups were opened and the growth on the surface of the soil was observed. The growth of the fungus on the surface of the treated samples was rated in comparison to the growth on the untreated samples on a percentage basis of the ability of the test compound to control or retard fungus growth. The results of the test were as follows:

| | Percent control | |
|---|---|---|
| Test compound | Rhizoctonia solani | Fusarium oxysporum |
| N-4-chlorophenyl-N-(N'-methylcarbamoyloxy)-chloroacetamide | 71.7 | 75.0 |
| N-3,4-dimethylphenyl-N-methoxy-chloroacetamide | 92.0 | 100.0 |
| N-2-methyl-3-chlorophenyl-N-methoxy-chloroacetamide | 93.3 | 100.0 |
| N-2-chlorophenyl-N-methoxychloroacetamide | 92.7 | 100.0 |

The compounds were used to control the fungus Puccinia rubigo-vera (leaf rust of wheat) by first preparing an aqueous fungicidal spray composition by admixing the above prepared emulsifiable concentrate with sufficient water to provide the desired concentration of the test compound. A series of six day old Henry wheat plants were treated with the compounds by spraying the composition for a period of about 30 seconds at a spray pressure of 80 pounds per square inch. Another series of plants were not so treated and were used for comparative purposes. After the treated plants had dried, both the treated and untreated plants were inoculated with a 9 to 13 day old culture of the fungus. The plants were then stored under conditions favorable to fungus growth for a period of 8 days. At the end of the period the plants were examined to determine the extent of fungus growth. The extent of the fungus growth in the treated plants was compared to that of the untreated plants and was rated on a percentage basis of the ability of the compounds to retard fungus growth. The results of the test were as follows:

| Test compound | Concentration [1] | Percent control |
|---|---|---|
| N-4-chlorophenyl-N-(N-methyl-carbamoyloxy)-chloroacetamide | 1,000 | 97.0 |
| N-3,4-dimethylphenyl-N-methoxy-chloroacetamide | 1,000 | 70.0 |

[1] Parts per million by weight.

A compound was used to control the fungus Erysiphe cichoracearum (powdery mildew of cucumber). A fungicidal composition was prepared as above having a concentration of 1000 p.p.m. by weight of the test compound. Susceptible species of cucumbers were grown in soil contained in plastic pots having 2 to 3 plants per pot. After the cucumber plants were 10 to 14 days old they were sprayed with the fungicidal composition. Another series of the plants was not sprayed and was used for comparative purposes. After the sprayed plants had dried each plant in both series was surrounded by 3 plants infested with fungus. After 9 to 14 days the extent of disease was observed and rated in comparison with the untreated plants. The results of the test were as follows:

Test Compound: N-4-Chlorophenyl-N-(N-methylcarbamoyloxy - chloroacetamide; Concentration, p.p.m. by weight: 1,000; Percent control: 77.3.

EXAMPLE 25

The nematocidal activity of the compounds of this invention can be demonstrated by the following tests:

The compounds were used to control rootknot nematodes. A sample of inoculated soil was prepared by mixing one part of sand, four parts of sterilized soil and three parts of soil from a four-month old rootknot nematode culture (Meloidogyne spp.). A portion of the soil sample was treated by mixing the soil with an amount of the emulsifiable concentrate, as prepared in Example 24, sufficient to provide the soil with the desired concentration of the compound. Another portion of the soil was not so treated and was used for comparative purposes. The treated soil as well as the untreated soil was placed into a series of plastic bags contained in glass Mason jars. The jars were sealed and stored at 70° F. for a period of about 7 days. At the end of this period the soil was transferred to plastic pots and tomato seedlings (Bonny Best) were planted in the soil. After 20 days, the soil was washed from the tomato plants and the number of root-knot nematode galls on the plants were counted. The degree of the nematode control of the test compound was evaluated on a percentage basis in comparison to the degree of galling in the untreated plants. The results of the tests are as follows:

Test Compound: N-phenyl - N-methoxychloroacetamide:
 Concentration; pounds/4 inch acre: 100; Percent control: 97.3.

The nematocidal activity of the compounds was further demonstrated in another test for the control of rootknot nematode. An inoculated soil sample prepared as above was placed in 4 inch plastic pots and manually compacted. The soil in one series of the pots was treated by drenching the soil in each pot with a quantity of the nematocide composition, as prepared above, sufficient to provide the desired concentration of the test compound. The other series of the pots was not so treated and was used for comparative purposes. Both series of pots were placed in a greenhouse and held for 7 days whereupon 10 to 14 day old tomato seedlings (Bonny Best) were planted in the pots. After about 2 weeks, the degree of nematode control was evaluated by comparing the number of rootknot nematode galls on the roots of the plants grown in the treated soil with the number of galls on the plants grown in the untreated soil. The results of the test were as follows:

| Test compound | Concentration, lb./acre of 4" depth | Percent control |
|---|---|---|
| N-phenyl-N-methoxychloroacetamide | 100 | 95.0 |
| N-phenyl-N-methoxy-n-propionamide | 100 | 94.0 |

EXAMPLE 26

The insecticidal activity of the compounds of this invention can be demonstrated by the following tests:

N-4-chlorophenyl-N-methoxy-isobutyramide was used to control insects according to the following procedures. An insecticidal spray composition was prepared by admixing the emulsifiable concentrate as prepared in Example 23 with sufficient water to provide a concentration of 3500 p.p.m. by weight of the test compound.

Southern armyworms [*Prodenia eridania* (cram)] were controlled by spraying lima bean leaves with the insecticidal composition and offering the sprayed leaves to armyworm larvae (third instar stage) for feeding. After 48 hours, it was observed that the mortality rate of the larvae was 100 percent.

House flies (three day old, *Musca domestica* L.) were treated by spraying a predetermined number of the flies contained in a wire mesh cage with the insecticidal composition. After 24 hours, it was observed that the mortality rate of the flies was 88 percent.

Mexican bean beetle (*Epilacina baribespis*) were controlled by offering lima bean leaves which had been dipped in the insecticidal composition to bean beetle larvae (third instar stage) for feeding. After 48 hours, it was observed that the mortality rate of the larvae was 100 percent.

EXAMPLE 27

The herbicidal activity of the compounds of this invention can be demonstrated by the following tests:

A herbicidal composition containing the test compound was prepared by admixing the emulsifiable concentrate as prepared in Example 23 with water. The compounds contained in the composition were used in the pre-emergence control of different plants as follows.

Small plastic pots filled with dry soil were seeded with the plant species to be controlled. About 24 hours after seeding, the pots were sprayed with water until the soil was wet. Then the soil was treated with the herbicidal composition by spraying the soil to provide the desired application rate of the test compound. After spraying, the pots were placed in a greenhouse under favorable growth conditions. After a period of about 15 to 21 days the condition of the plants and the degree of injury to the plants were rated on a scale of 0 to 10 as follows: 0=no injury; 1, 2=slight injury; 3, 4=moderate injury; 5, 6=moderately severe injury; 7, 8, 9=severe injury; 10=death. The results of the test are summarized below.

The compounds contained in the compositions were also used in the post-emergence control of certain plants. The herbicidal compositions, as prepared above, were sprayed on the foliage of the plants to be controlled in an amount sufficient to provide the desired application rate of the test compound. After spraying, the plants were placed in a greenhouse under favorable growth conditions. After 10 to 15 days the condition of the plants and the degree of injury was rated as indicated above. The results of the test were as follows.

| Test Compound | Plant controlled | Application rate [1], post-emergence | Injury Rating |
|---|---|---|---|
| N-3-chlorophenyl-N-methoxy-chloroacetamide | Mustard | 8 | 10 |
|  | Pigweed | 8 | 8 |
|  | Safflower | 8 | 8 |
|  | Pre-emergence | | |
| N-4-chlorophenyl-N-methoxy-isobutyramide | Dock | 8 | 10 |
|  | Pre-emergence | | |
| N-2-methyl-3-chlorophenyl-N-methoxychloroacetamide | Downybrome | 8 | 10 |
|  | do | 2 | 10 |
|  | Purslane | 4 | 10 |
|  | Ryegrass | 4 | 10 |
|  | do | 1 | 10 |

Footnote at end of table.

TABLE—Continued

| Test Compared | Plant controlled | Application rate[1], post-emergence | Injury Rating |
|---|---|---|---|
| | Post-emergence | | |
| N-4'-chlorophenyl-N-methoxy-α-(2-methyl-4-chlorophenoxy)-acetamide | Velvet Leaf | 8 | 10 |
| | do | 2 | 10 |
| | Velvet Leaf | ½ | 5 |
| | Dock | 8 | 9 |
| | do | 2 | 9 |
| | Mustard | 8 | 9 |
| | do | 2 | 9 |
| | do | ½ | 7 |
| | Kochia | 8 | 10 |
| | do | 2 | 9 |
| | Purslane | 8 | 7 |
| | do | 2 | 7 |
| | Pigweed | 8 | 10 |
| | do | 2 | 10 |
| | do | 1 | 9 |
| | Wild Buckwheat | 2 | 8 |
| | Canadian Thistle | 2 | 9 |
| | Annual Morning Glory | 2 | 8 |
| | Pre-emergence | | |
| | Mustard | 4 | 10 |
| | Johnsongrass | 2 | 6 |
| | do | 8 | 7 |
| | Crabgrass | 2 | 7 |

[1] Of test compound, lb./acre of 4" depth.

We claim:

1. A compound of the formula:

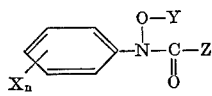

wherein $n$ is an integer of from 0 to 3; X is selected from the group consisting of halogen, alkyl of from 1 to about 5 carbon atoms, alkenyl of from 2 to about 5 carbon atoms, nitro, hydroxy, alkoxy of from 1 to about 5 carbon atoms and alkylsulfonyl of from 1 to about 5 carbon atoms and where Y is a carbamoyl radical of the formula:

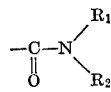

wherein $R_1$ and $R_2$ are independently selected from the group consisting of hydrogen, alkyl of from about 1 to about 5 carbon atoms and phenyl; and Z is selected from the group consisting of alkyl of from 1 to about 5 carbon atoms, alkenyl of from 2 to about 5 carbon atoms and cycloalkyl of from 3 to about 7 carbon atoms.

2. The compound of claim 1 wherein Y is a carbamoyl radical of the formula:

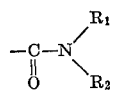

wherein $R_1$ and $R_2$ independently are selected from the group consisting of hydrogen, alkyl of from 1 to about 5 carbon atoms and phenyl.

3. The compound of claim 2 wherein Y is N-methylcarbamoyl.

4. The compound of claim 1 wherein it is N-3,4-dichlorophenyl-N-(N-methylcarbamoyloxy)-n-butyramide.

5. The compound of claim 1 wherein it is N-4-methylphenyl-N-(N-methylcarbamoyloxy)-isobutyramide.

6. The compound of claim 1 wherein it is N-3-chloro-4-methylphenyl - N - (N - methylcarbamoyloxy)-butyramide.

7. The compound of claim 1 wherein it is N-4-chlorophenyl-N-(N-methylcarbamoyloxy)-chloroacetamide.

References Cited

UNITED STATES PATENTS

| 2,341,868 | 2/1944 | Hitchcock et al. | 71—118 |
| 2,394,916 | 2/1946 | Jones | 71—115 |
| 2,577,969 | 12/1951 | Jones | 71—118 |
| 3,192,261 | 6/1965 | Losee et al. | 260—545 |
| 3,277,107 | 10/1966 | Neighbors | 71—118 |
| 3,458,570 | 7/1969 | Baker et al. | 260—545 |
| 3,166,589 | 1/1965 | Richter | 260—453 |
| 3,166,591 | 1/1965 | Richter | 260—453 |
| 3,168,561 | 2/1965 | Richter | 260—453 |
| 3,187,041 | 6/1965 | Richter | 260—453UX |
| 3,187,042 | 6/1965 | Richter | 260—453UX |
| 3,236,871 | 2/1966 | Hinman et al. | 260—453 |
| 3,306,726 | 2/1967 | Berliner et al. | 260—453X |
| 3,342,678 | 9/1967 | Berger et al. | 260—453X |
| 3,352,897 | 11/1967 | Richter | 260—453 |
| 3,352,899 | 11/1967 | Taniguichi et al. | 260—453 |
| 3,364,110 | 1/1968 | Lehr et al. | 260—453UX |
| 3,371,106 | 2/1968 | Berliner et al. | 260—453 |
| 3,439,018 | 4/1969 | Brookes et al. | 260—453X |
| 3,444,232 | 5/1969 | Bernstein | 260—453 |

ELBERT L. ROBERTS, Primary Examiner

G. HOLLRAH, Assistant Examiner

U.S. Cl. X.R.

71—103, 118; 260—453; 424—286, 324

UNITED STATES PATENT OFFICE
CERTIFICATE OF CORRECTION

Patent No. 3,567,776        Dated March 2, 1971

Inventor(s) John Krenzer and Sidney B. Richter

It is certified that error appears in the above-identified patent and that said Letters Patent are hereby corrected as shown below:

Column 1, line 64 for "reaction" read --reacting--.

In formula, column 1, lines 66 to 70 the portion shown as

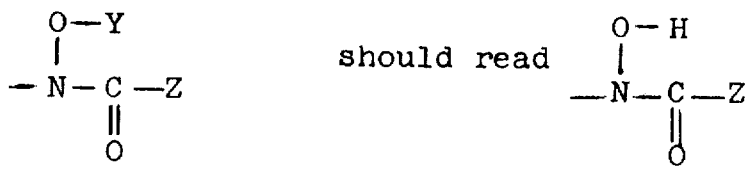

Column 4, line 75 for "5.57" read --7.57--.

Column 11, line 71 for "sidepress" read --sidedress--.

Column 12, line 61 for "dinitrocyclorexylphenol" read --dinitrocyclohexylphenol--.

Column 13, line 44 for "tetravorate" read --tetraborate--.

Column 14, line 42 for "chloraaceta-" read --chloroaceta-

Column 17, in the heading of the Table for "Compared" read --Compound--.

Signed and sealed this 28th day of November 1972.

(SEAL)
Attest:

EDWARD M. FLETCHER, JR.
Attesting Officer

ROBERT GOTTSCHALK
Commissioner of Pat